Figure 1:
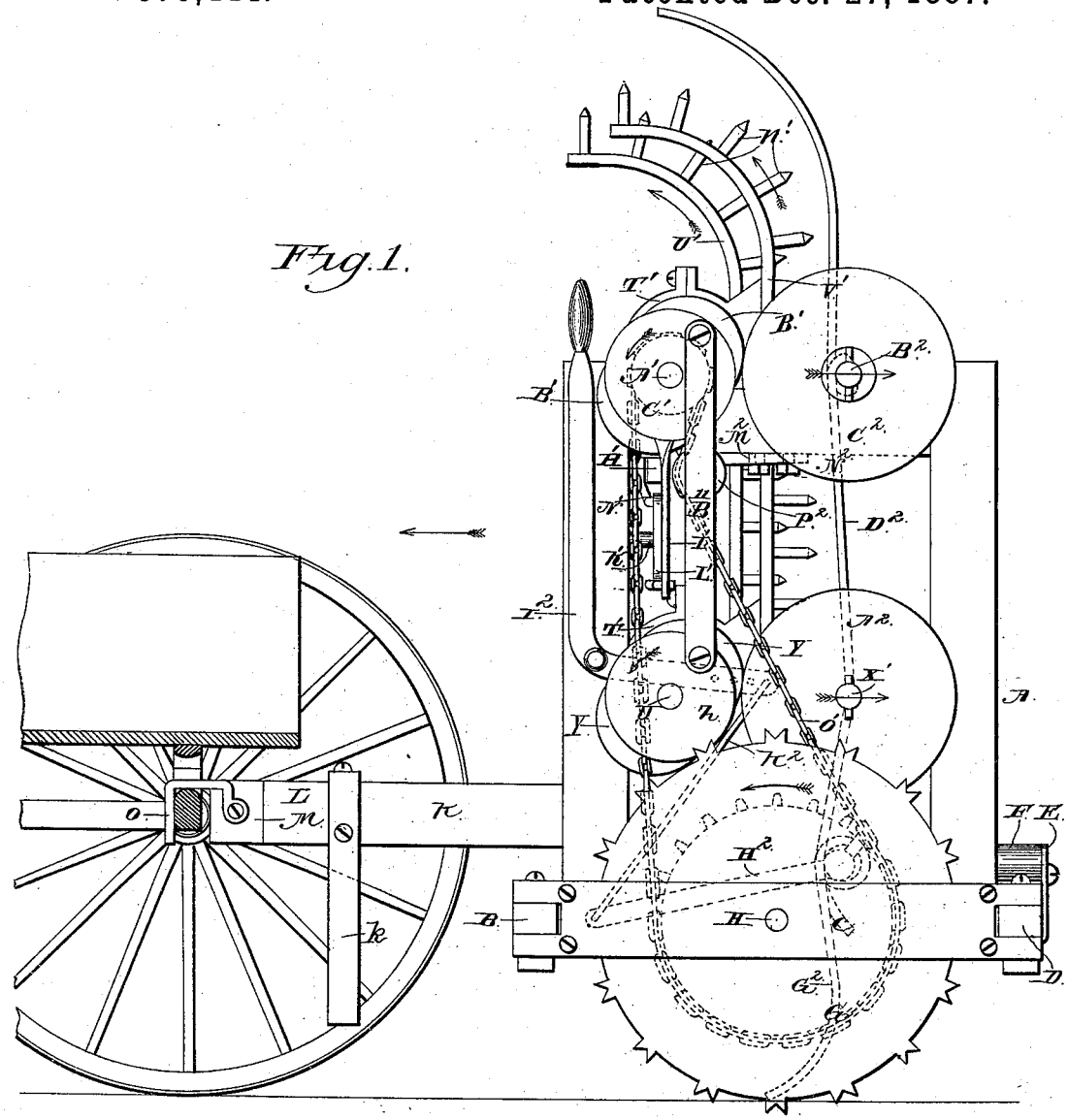

(No Model.) 5 Sheets—Sheet 1.
W. L. EVANS, Jr.
HAY RAKE AND LOADER.
No. 375,444. Patented Dec. 27, 1887.

Witnesses
M. Fowler
E. G. Siggers

Inventor
Wm L. Evans Jr
By his Attorneys,
C. A. Knowles

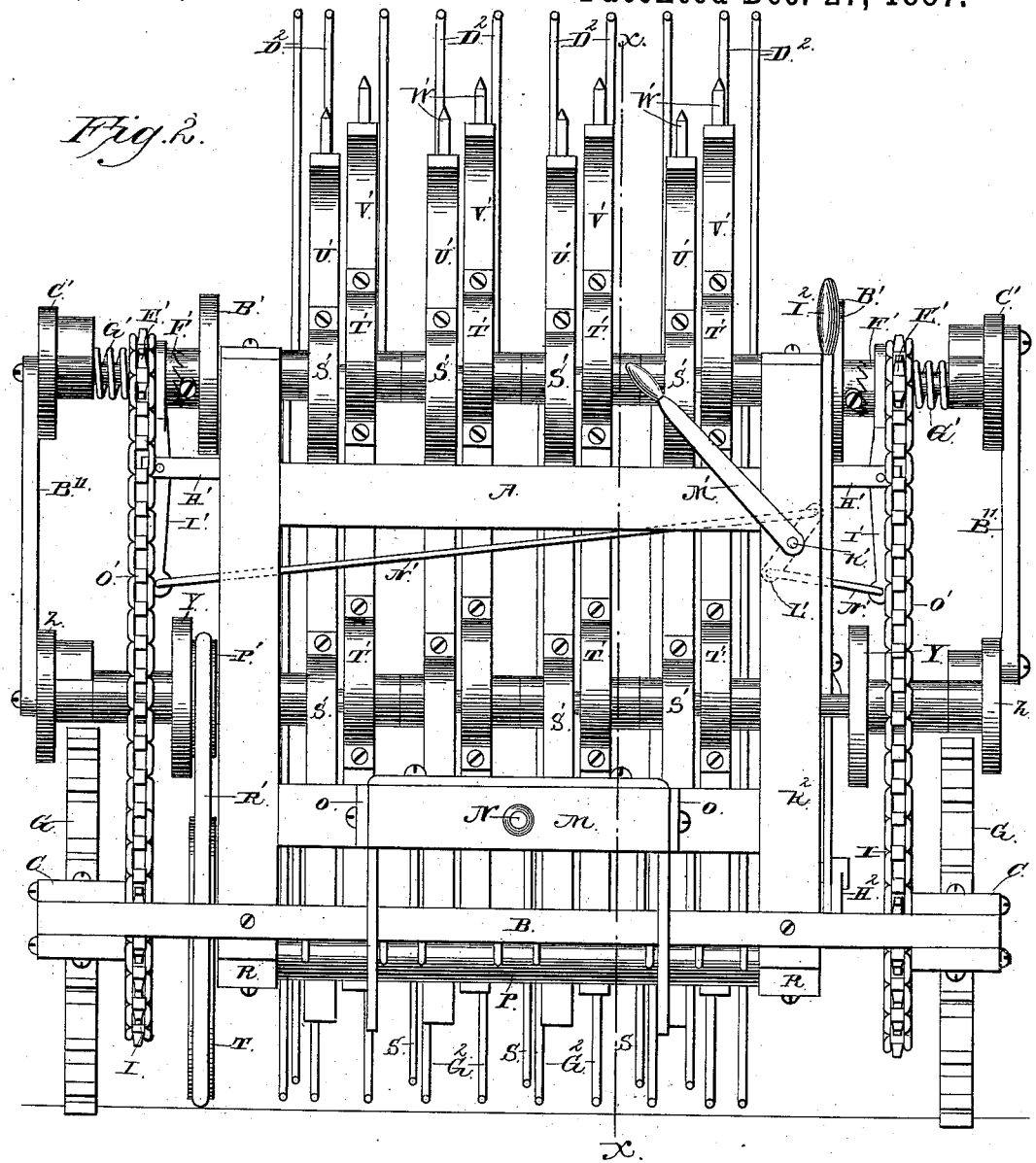

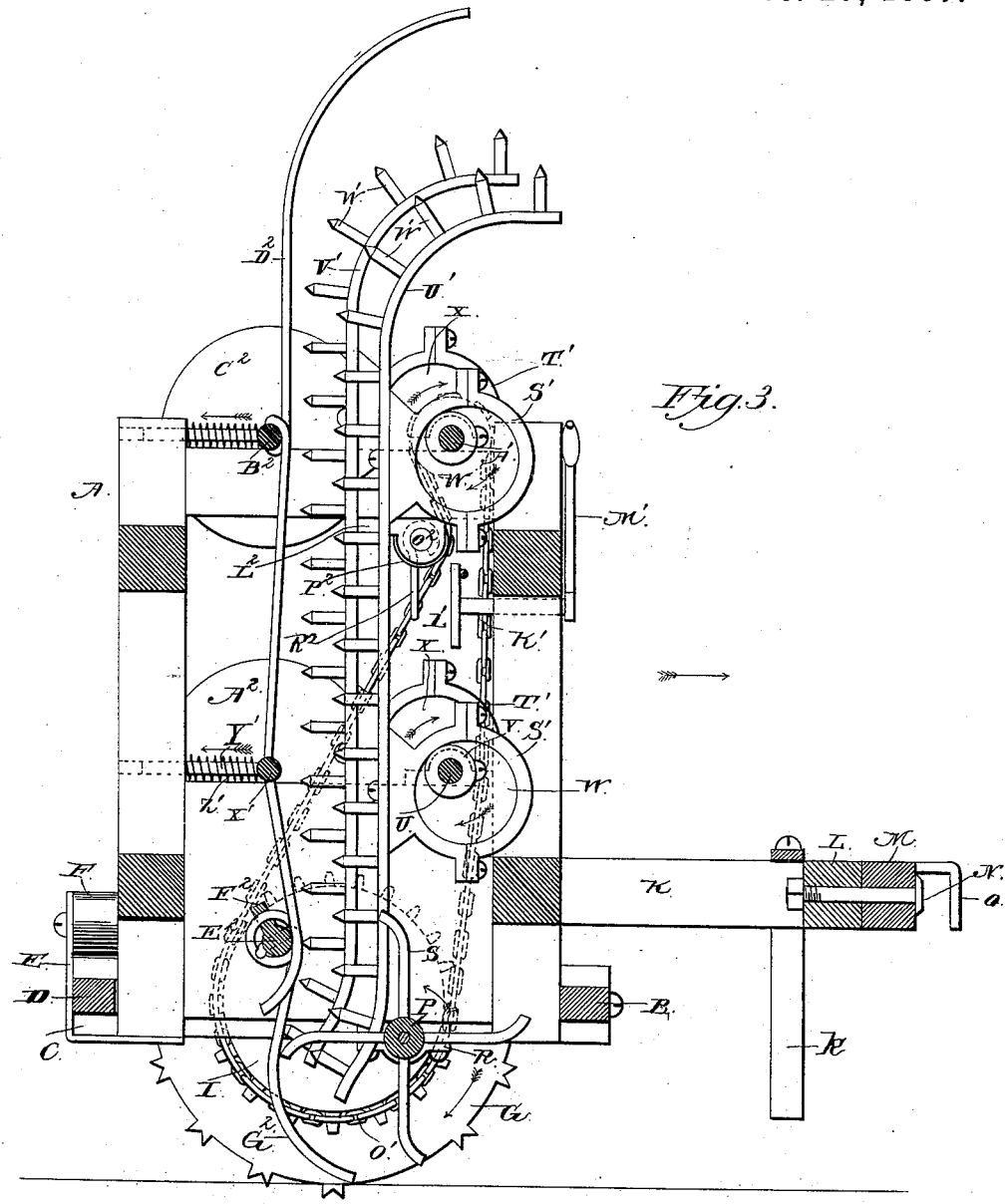

(No Model.) 5 Sheets—Sheet 4.
W. L. EVANS, Jr.
HAY RAKE AND LOADER.
No. 375,444. Patented Dec. 27, 1887.
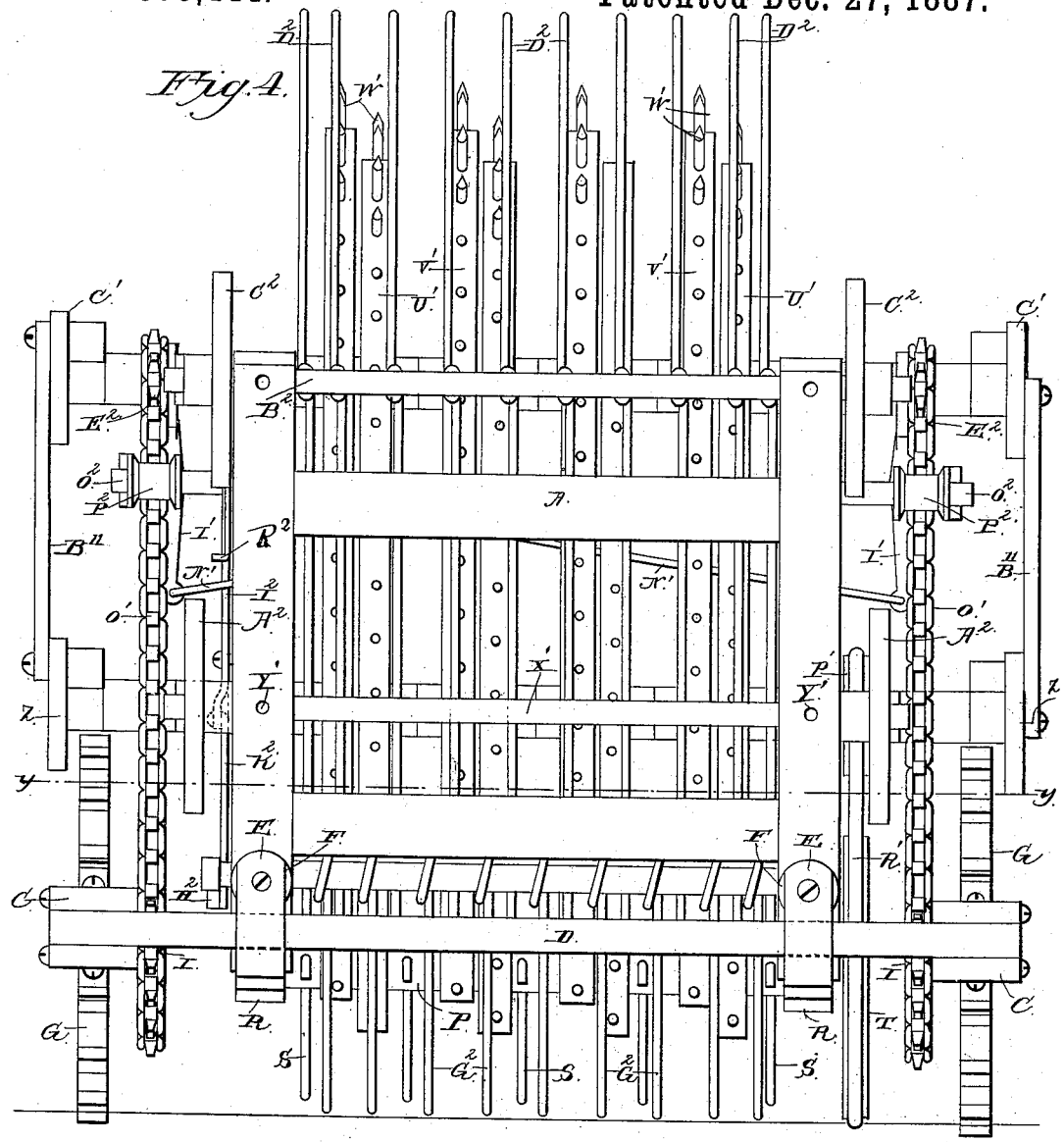
Witnesses
M. Fowler
E. G. Siggers
Inventor
Wm L. Evans Jr.
By his Attorneys
Knowles

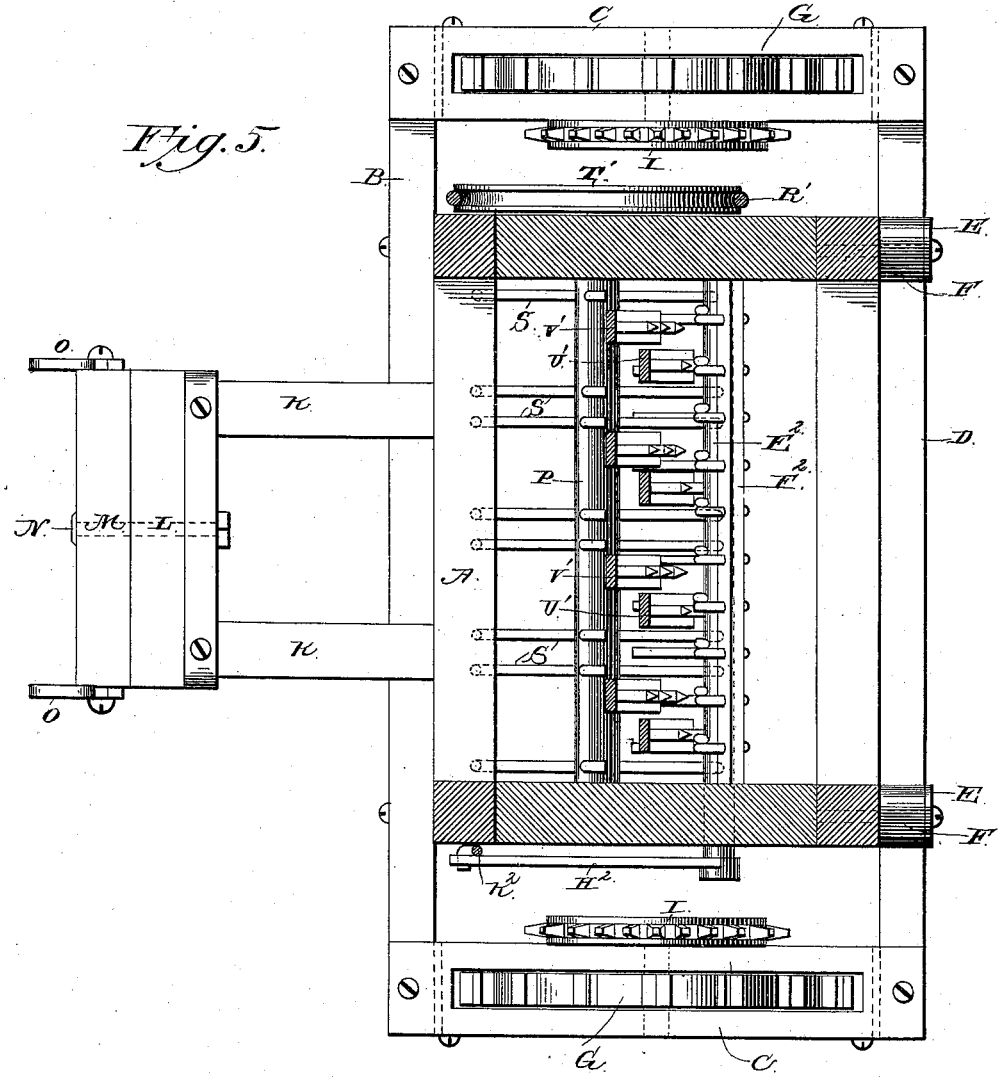

United States Patent Office.

WILLIAM LEWIS EVANS, JR., OF LOOGOOTEE, INDIANA.

HAY RAKE AND LOADER.

SPECIFICATION forming part of Letters Patent No. 375,444, dated December 27, 1887.

Application filed April 28, 1887. Serial No. 236,482. (No model.)

*To all whom it may concern:*

Be it known that I, WILLIAM LEWIS EVANS, Jr., a citizen of the United States, residing at Loogootee, in the county of Martin and State of Indiana, have invented a new and useful Improvement in Hay Rakes and Loaders, of which the following is a specification.

My invention relates to an improvement in hay rakes and loaders; and it consists in the peculiar construction and combination of devices that will be more fully set forth hereinafter, and particularly pointed out in the claims.

In the drawings, Figure 1 is a side elevation of a hay rake and loader embodying my improvements. Fig. 2 is a front elevation of the same. Fig. 3 is a vertical sectional view taken on the line $x\,x$ of Fig. 2. Fig. 4 is a rear elevation. Fig. 5 is a horizontal sectional view taken on the line $y\,y$ of Fig. 4.

A represents a vertical rectangular frame, which comprises the main frame of the machine. To the front side of the main frame, at the lower end thereof, is secured a transverse beam, B, the ends of which project beyond the sides of the frame A.

C represents a pair of end bars, which have their front ends pivoted to the extremities of the bar B in such a manner that the said bars C are free to swing laterally toward and from the main frame. The rear ends of the swinging bars C are connected together by a bar, D, the said bar having its extremities pivoted to the swinging bars and arranged on the rear side of the main frame. The latter is provided with keepers E, in which the bar D is guided, and at the upper ends of the said keepers are journaled anti-friction rollers F, which bear upon the upper side of the bar D. Each of the bars C is provided with a vertical longitudinal slot, and in the said slots are arranged driving-wheels G. The said driving-wheels are journaled between the sides of the bars C by means of spindles or shafts H. The inner ends of the said spindles or shafts project beyond the inner side of the bars C, and on the said projecting ends of the said spindles or shafts are keyed sprocket-wheels I.

It will be readily understood from the foregoing description, and by reference to Fig. 5 of the drawings, that when the machine is in motion the driving-wheels G are adapted to play laterally and to accommodate themselves to inequalities in the ground without influencing the main frame, and will at all times keep the machine in line with the wagon.

From the front side of the main frame, near the lower end thereof, projects a pair of bars, K, which have their front ends connected together by a cross-bar, L.

M represents a bar, which is pivoted on the front side of the bar L by means of a central horizontal bolt, N, and thereby the said bar M is adapted to swing vertically on the front end of the frame A. To the ends of the said bar M are pivoted hooks or catches O, which are adapted to engage the rear axle of a hay-wagon, and thereby couple the hay rake and loader thereto in such a manner that when the wagon is drawn across a field the hay rake and loader will be trailed in rear thereof.

$k$ represents a pair of vertical standards of suitable length, which are attached to the bars K and depend therefrom. When the machine is attached to a wagon, the standards are raised from the ground, as shown at Figs. 1 and 3; but when the machine is detached from the wagon the standards $k$ rest on the ground and support the machine, as will be readily understood.

P represents a horizontal shaft, which is journaled in bearing-blocks R on the lower sides of the frame A, near the front side thereof. From this shaft P project radial rake-teeth S, the outer ends of which are curved, as shown. One end of the shaft P projects beyond one side of the main frame, and to it is keyed a large pulley, T.

U represents a transverse shaft, which is journaled in bearing-blocks V, near the front side of the main frame, and at a suitable distance above the shaft P. To that portion of the shaft U which is between the sides of the main frame are secured two series of circular eccentrics, W and X, which project from opposite sides of the shaft. The ends of the shaft project beyond the sides of the main frame. Near the extremities of the shaft U are keyed a pair of eccentric-cams, Y, which are arranged in the same position on the shaft. To the extreme ends of the shaft U are keyed a pair of crank-wheels, Z, the crank-pins of which are out of line with each other, and arranged at an angle of ninety degrees with reference to each other.

A' represents a shaft, which is similar to the shaft U, and is journaled in bearing-blocks on the upper side of the main frame. To this shaft A' are attached two series of oppositely-extending eccentrics, W and X, which are precisely similar to the eccentrics on the lower shaft, U, and are arranged in the same vertical planes with the said eccentrics.

B' represents a pair of eccentrics, which are secured on the projecting portions of the shaft A' and are parallel with the eccentrics Y on the lower shaft, U.

C' represents a pair of crank-wheels, which are keyed to the extreme ends of the shaft A' and have their crank-pins arranged parallel with the crank-wheels on the shaft U, and are connected to the latter by means of rods B''.

E' represents a pair of sprocket-wheels, which are loosely mounted on the spindles of the shaft A', and are provided with clutches F', adapted to engage the hubs or sleeves of the eccentrics B', and thereby rigidly secure the said sprocket-wheels to the shaft. Springs G' bear against the outer sides of the sprocket-wheels to keep them normally engaged with the sleeves of the eccentrics B'. From the sides of the main frame project brackets H', to the outer ends of which are fulcrumed levers I', the upper ends of which engage the sliding sprocket-wheels.

K' represents a rock-shaft, which is journaled in one of the corner-posts on the front side of the main frame. To the rear end of this rock-shaft is secured an oppositely-extending arm, L', and to the front end of the said shaft is attached the lever M', by means of which the shaft may be partly rotated. The extremities of the arm L' are connected to the lower ends of the levers I' by means of rods N'. By this construction the sprocket-wheels on the shaft A' may be moved outwardly thereon and caused to disengage the sleeves of the eccentrics B', when it is desired to throw the machine out of gear, by simply operating the lever M' so as to turn the arm L', and thereby draw the lower ends of the levers I' toward each other.

O' represents a pair of endless sprocket-chains, which connect the sprocket-wheels I with the sprocket-wheels E'.

P' represents a pulley, which is secured to the lower shaft, U, near one end thereof. The said pulley is connected to the pulley T by means of an endless belt, R'.

From the foregoing description it will be understood that when the machine is drawn forward the shafts U and A' will be rotated simultaneously in the same direction and at the same rate of speed.

S' represents eccentric-straps, which are secured on the peripheries of the eccentrics W, and T' represents similar eccentric-straps, which are secured on the eccentrics X. Each vertical pair of eccentric-straps S' is connected by a vertical bar, U', and each pair of eccentric-straps T' is connected by a vertical bar, V'. The said bars are secured to the rear sides of the eccentric-straps. The upper ends of the said bars extend above the upper shaft, A', and are curved forward, and the lower ends of the said bars extend below the shaft U for a considerable distance and to within a short distance of the ground. From the rear side of the bars U' and V' project engaging-teeth W'.

X' represents a transverse rod, which extends across the main frame, near the rear side thereof, and is provided with a pair of rearwardly-extending arms, Y', which pass through horizontal longitudinal openings made in the rear corner-posts of the main frame. The shaft X' is supported on the same horizontal plane with the shaft U.

Z' represents coiled extensile springs, which are arranged on the arms Y', and bear between the rear sides of the shaft X' and the front sides of the rear corner-posts of the main frame. The function of these springs is to move the rods X' forward in the frame. On the ends of the said rod are loosely journaled wheels $A^2$, which bear against the rear sides of the eccentrics Y.

$B^2$ represents a rod, which is similar to the rod X', and is arranged on the upper side of the main frame in line with the upper shaft, A'. This bar $B^2$ has rearwardly-projecting arms and bearing-springs similar to those with which the rod X' is provided, and on the ends of the rod $A^2$ are journaled a pair of wheels, $C^2$, which bear against the rear sides of the eccentrics B'.

$D^2$ represents a vertical series of rods which connect the bars X' and $B^2$. The lower ends of the said rods $D^2$ extend downward to within a suitable distance of the ground, and the upper ends of the said rods extend above the upper shaft, $B^2$, and are curved forward, as shown.

$E^2$ represents a transverse rock-shaft, which is journaled between the sides of the frame at the inner end thereof, and just in rear of the rods $D^2$. Just in rear of the rods $D^2$, on the upper side of the rock-shaft $E^2$, is secured a transverse bar, $F^2$, which forms, practically, a projecting flange on the rock-shaft.

$G^2$ represents a series of spring rake-teeth, each of which is made of a single piece of spring-rod. The said rake-teeth are curved in the form shown in Fig. 3, and their upper portions are curved rearward and pass through transverse openings in the bar $F^2$, and are then curved downward and forward to encompass the under side of the rock-shaft $E^2$, and have their extremities passed through transverse openings in the said shaft.

$H^2$ represents a lever-arm, which is secured to one end of the rock-shaft that projects beyond one side of the main frame.

$I^2$ represents a bell-crank lever, which is fulcrumed to the same side of the main frame, and the rearwardly-extending arm of the said bell-crank lever is connected to the lever H² by means of a rod, K².

From the foregoing description it will be understood that by moving the upper end of the bell-crank lever forward from the main frame the lever-arm H² will be raised, and thereby the rock-shaft E² will be partly turned, so as to raise the lower end of the rake-teeth from the ground. By moving the upper end of the bell-crank lever rearward the lower ends of the rake-teeth may be lowered to the ground.

R² (shown in Figs. 3 and 4) represents a hook which is loosely connected to the shaft O², and is adapted to engage one of the openings in the short arm of bell-crank lever I² when the latter is turned, so as to raise the points of the rake-teeth from the ground, and thus support the rake-teeth in this elevated position.

The operation of my invention is as follows: As the machine advances, the rake-teeth gather the hay, and the revolving radial teeth of the shaft P raise the hay, as it is gathered by the rake-teeth, to a sufficient height to cause it to be engaged by the teeth of the bars U' V', connected to the eccentrics. As the said eccentrics project in opposite directions from their shafts, it follows that the toothed bars which constitute the elevator alternately move rearward and upward and forward and downward. The vertical rods D² and the transverse spring-actuated bars, to which they are connected, constitute a compressor-frame, the function of which is to force the hay forward onto the teeth of the elevating-bar. One series of the said elevating-bars engages the hay and moves it upward on the front side of the compressor-frame, while the other series of elevating-bars disengages the hay and moves downward, ready to take a fresh hold on the hay. By this means the hay is continually urged upward, and, owing to the forward inclination of the upper ends of the elevating-bars and of the compressor-frame, the hay is discharged from the front side of the upper end of the elevator and falls therefrom onto the wagon to which the machine is attached. When the eccentrics Y and B' are in a vertical position, the compressor-frame moves forward, and when the said eccentrics are in a horizontal position the said compressor-frame moves rearward by reason of the wheels with which the compressor-frame is provided, and which bear against the rear sides of the said eccentrics.

In order to keep the sprocket-chains taut at all times, and thereby secure continuous operation of the elevating-bars, I provide a pair of brackets, L², which are provided with longitudinal slots M².

N² represents clamping-bolts, which extend through the said slots and enter the under sides of the top longitudinal connecting-bars of the main frame, and thereby secure the brackets thereto. From the outer sides of the said brackets project shafts O², on which are journaled pulleys P², that bear against the rear sides of the sprocket-chains. By loosening the securing-bolts and moving the brackets forward from time to time, as it becomes necessary, the pulleys $p^2$ may be caused to bear against the rear sides of the sprocket-chains, and keep the latter sufficiently tightened at all times to insure the operation of the machine.

The particular advantage of the swinging frame may be found when turning the wagon. As the main frame is attached to the wagon in such a manner that the elevator and rake will be continually in line with the hay-bed and coupling-pole of the wagon, therefore when the wagon turns the swinging frame will move in either direction and allow the wheels of the machine to follow the wagon.

The machine is allowed to adapt itself to the irregularities of the ground by the following means: First, the front part of the main frame has a horizontal piece, M, attached to it by a single bolt, which allows the wheels to drop into depressions or pass over obstructions; second, the hooks O, that attach the machine to the hind axle of the wagon, are pivoted onto said horizontal piece. This allows the machine to have an opposite motion to that described.

I do not wish to be limited to the precise details of construction, as I am aware that many minor changes can be made without departing from the spirit or scope of my invention. For instance, I do not wish to be limited to the use of the two sets of eccentrics W X, as one set may be found sufficient.

Having thus described my invention, I claim—

1. The combination of the parallel shafts having the oppositely-extending series of eccentrics, and the eccentrics Y and B', arranged parallel with each other, the bars connected to the eccentrics by means of eccentric-straps and provided with the rearwardly-extending teeth, and the longitudinally-movable spring-actuated compression-frame arranged in rear of the toothed bars and provided with wheels bearing against the rear side of the eccentric-cams Y and B', substantially as described.

2. In a hay rake and loader, the combination of the main frame having the forwardly-extending bars K, the cross-bar L, connecting their front ends, the bar M, centrally pivoted to the bar L and adapted to swing in a vertical direction, said bar M having devices to engage the rear axle of a wagon, the side bars, C, having their front ends pivotally connected on opposite sides of the frame, and adapted to swing laterally toward and from the same, and the supporting-wheels G, journaled to the said swinging bars, substantially as described.

3. The combination, in a hay rake and loader, of the main frame adapted to be trailed in rear of a wagon, the bar B on the front side of the main frame, the side bars, C, having their front ends pivotally connected to the ends of the bar B, the bar D, pivotally connecting the rear ends of side bars, C, the anti-friction rollers journaled to the rear side of the main frame and bearing on the bar D, and the supporting-wheels G, journaled to the side bars, C, all combined and adapted to operate substantially in the manner and for the purpose set forth.

4. In combination with the elevator, comprising, essentially, the shafts A' and U, the eccentrics operated thereby, the toothed elevating-bars worked by the eccentrics, and the compression-frame composed of the shafts carrying the toothless bars and having the friction-wheels bearing against the eccentrics on shafts A' and U of the elevator, as set forth.

5. In combination with the elevator, comprising, essentially, the shafts A' and U, the eccentrics operated thereby, the toothed elevating-bars worked by the eccentrics, the compression-frame composed of the shafts B² and X', carrying the toothless bars and having the friction-wheels bearing against the eccentrics on shafts A' and U of the elevator, and spring-actuated means for the bars of the compression-frame, as set forth.

6. In a hay rake and loader, the main frame carrying the elevator, in combination with the swinging frame outside the main frame, the main frame being connected to the wagon, and the driving-wheels carried by the swinging frame, whereby the wheels of the hay rake or loader will be caused to follow the wheels of the wagon, as set forth.

7. In a hay rake or loader, the main frame carrying the elevator and adapted to be hitched to the wagon, in combination with the laterally-swinging frame composed of the bars C D, loosely pivoted together, said swinging frame carrying the wheels G, as set forth.

8. In combination with the main frame carrying the elevator and rake, the laterally-swinging frame carrying the supporting and driving wheels, and the keepers and friction-rollers connecting the main and carrying frames, as set forth.

9. In combination with the main frame carrying the elevator and rake, the bar M, pivotally mounted on the main frame and carrying devices to engage the rear end of a wagon, and the swinging frame outside the main frame and carrying the supporting and driving wheels, as set forth.

In testimony that I claim the foregoing as my own I have hereto affixed my signature in presence of two witnesses.

WILLIAM LEWIS EVANS, JR.

Witnesses:
L. C. BROOKS,
JAMES WOOD.